United States Patent [19]

West

[11] Patent Number: 4,587,987
[45] Date of Patent: May 13, 1986

[54] SHEAR PIN RELIEF VALVE

[75] Inventor: David G. West, McLoud, Okla.

[73] Assignee: Cooper Industries, Inc., Houston, Tex.

[21] Appl. No.: 643,531

[22] Filed: Aug. 23, 1984

[51] Int. Cl.⁴ ............................................. F16K 13/04
[52] U.S. Cl. ....................................... 137/70; 137/71; 137/377; 220/89 A
[58] Field of Search ............... 137/68 R, 70, 71, 377, 137/797; 220/89 A

[56] References Cited

U.S. PATENT DOCUMENTS

| | | | |
|---|---|---|---|
| 2,141,847 | 12/1938 | Tennant | 137/70 |
| 2,303,392 | 12/1942 | Scaramucci | 137/70 |
| 2,589,144 | 3/1952 | Russell | 220/89 A |
| 2,725,072 | 11/1955 | Hershman | 137/377 |
| 3,433,387 | 3/1969 | Wilson | 220/89 A |
| 3,603,333 | 9/1971 | Anderson | 137/70 |
| 4,402,334 | 9/1983 | Taylor | 137/70 |

FOREIGN PATENT DOCUMENTS 2076917 12/1981 United Kingdom ............ 137/68 A

*Primary Examiner*—Harold W. Weakley
*Attorney, Agent, or Firm*—Arnold, White & Durkee

[57] ABSTRACT

In accordance with an illustrative embodiment of the present invention, a pressure relief valve comprises a valve body having an inlet passageway and a valve seat surrounding the passageway, a valve element normally engaging the seat to close the passageway; and a shear mechanism for enabling the valve element to disengage from the seat at a selected relief pressure, the mechanism including a bar that engages the valve element and is pivotally mounted on the valve body to one side of the axis of the passageway, a link also pivotally mounted on the valve body to the other side of the said axis, and a frangible member having a non-circular cross-section and being received in aligned holes in the bar and link, one of which has holes of companion cross-sections with that of the frangible member.

4 Claims, 6 Drawing Figures

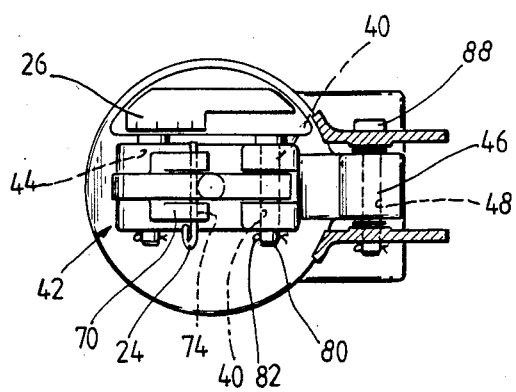
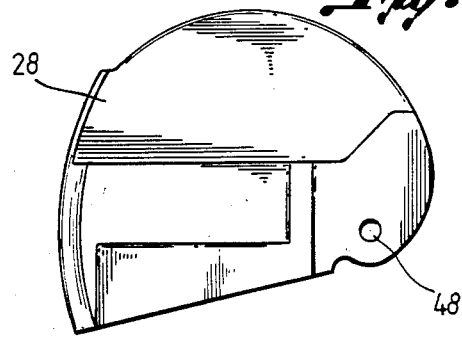
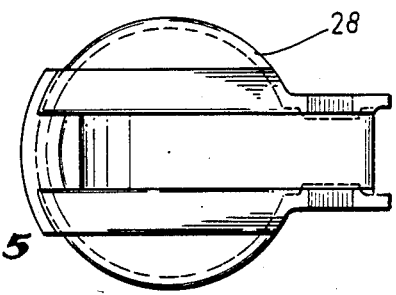
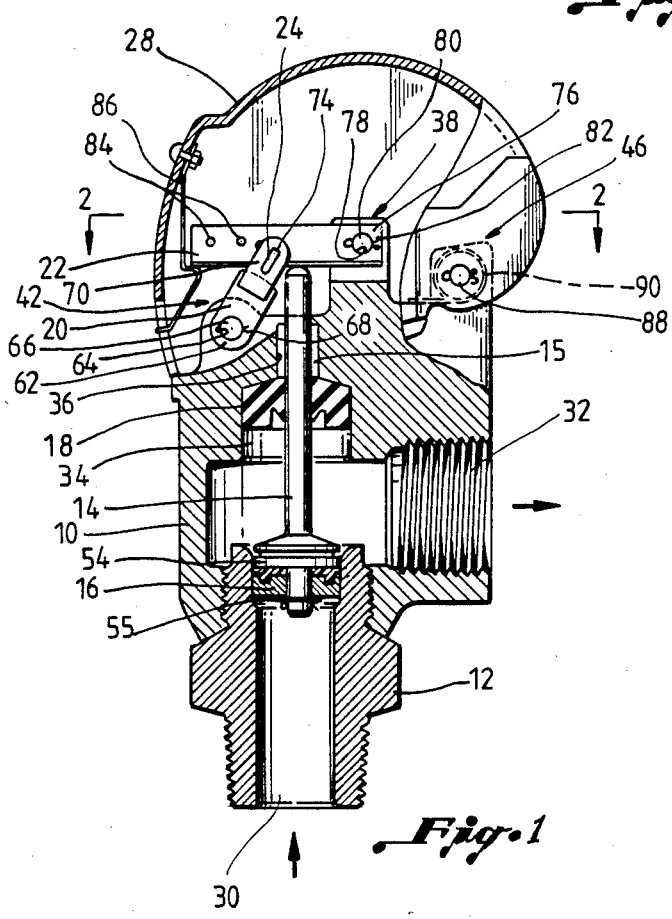
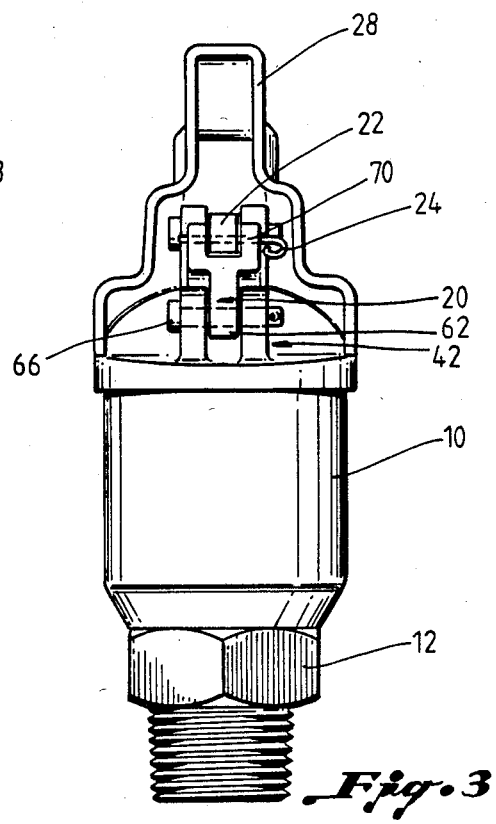

SHEAR PIN RELIEF VALVE

FIELD OF THE INVENTION

The present invention relates generally to an apparatus for relieving gas or fluid pressure and more particularly relates to pressure relief valves utilizing shearable pins for retaining the pressure.

BACKGROUND OF THE INVENTION

In pressurized systems, various types of pressure relief valves (also called "safety relief" valves) are used to release pressure so as to avoid damage to the system. These systems are common in oil field operations.

Various types of pressure relief valves are commercially available. Some types use so-called rupture discs which are metal or plastic diaphragms that rupture to allow the gas or fluid to escape. Generally, the pipe or vessel where the rupture disc is located must be depressurized in order to replace the burst diaphragm.

Flapper-type valves are commonly used for large vessels having low relief pressure settings. So-called conventional-type relief valves are also commonly used. These are essentially spring-loaded disc valves. These are commercially available from several manufacturers. "Pilot"-type pressure relief valves are also used. These retain pressure by air pressure which in turn is retained by a very small relief valve.

A still different type of pressure relief valve uses a shear pin to keep the valve closed until an excessive pressure occurs. At that point the pin shears and permits the relief valve to open, thus relieving the pressure. Two of the commercially available shear-in type relief valves use standard U.S. penny-weight nails as shear pins. These valves, therefore, have different settings depending on which penny-weight nail is used, and depending on whether two nails are used instead of just one nail. With such valves, dangerous overpressure of the pressurized system can occur if pins or similar devices of high shear strength should be substituted for nails of low shear strength.

SUMMARY OF THE INVENTION

The present invention relates generally to a pressure relief valve which opens when the pressure on the valve is sufficient to shear a linkage. More particularly, the valve of the invention includes a body member which has a pressure inlet, and a passageway which extends from the inlet through the valve. An inward opening, normally closed valve is positioned in the inlet. A valve stem extends from the valve through the passageway to terminate outside the body member. A bar member positioned exterior of the body member holds the valve in its closed position by abutting against the exterior end of the valve stem. The bar member, in turn, is held in position by connections to the body member. One such connection is a pivot which enables the bar member to swing away from its abutting position on the valve stem. The other connection is a frangible link which is designed to break when pressure at the pressure inlet exceeds a particular value.

In a preferred form, the invention makes use of a shear pin to provide the frangible feature in the frangible link. The shear pin is used to pin one end of the link to the bar member. Preferably, the shear pin has a cross-sectional shape which is unique or non-standard in the sense that a nail, an Allen wrench, a piece of wire or some other conventional item can not be used in place of the shear pin. Similarly, the holes in the bar member or the link through which the shear pin is inserted should be configured to receive only the special shear pin.

An especially attractive feature of the invention is the fact that it can be readily adapted to provide a series of pressure relief settings using a single type of shear pin. This flexibility is attainable by providing a series of holes along the bar member through which the shear pin can be inserted. Since the distance of the shear pin from the pivotally mounted end of the bar member will vary, depending on the hole in the bar member which is pin-connected to the hole in the link, it will be apparent that the pressure acting on the valve can be caused to act through different lever arms on the shear pin. Thus, the longer the length of the lever arm between the shear pin and the pivotal mounting of the bar becomes in relation to the lever arm between the valve stem and the pivotal mounting of the bar, the higher the pressure relief setting for the relief valve will become. Conversely, the shorter the lever arm between the shear pin and the pivotal mounting of the bar becomes, the lower the pressure relief setting will become.

In another preferred form of the invention, the valves of the invention are provided with covers which automatically open when the valves are opened by excessive pressure. When the covers are in the closed position, they serve to protect the valves from accidental damage. When the covers are open, they quickly and clearly indicate that the valves have been actuated.

As will be apparent, the valves of the invention are characterized by a rugged construction which is relatively simple in design but at the same time both flexible and safe. Its levered linkage system provides positive valve action, and its plurality of shear pin holes provides a range of operating pressures. Its specially designed shear pins and cover further impart desirable safety features to protect both equipment and personnel.

BRIEF DESCRIPTION OF THE DRAWINGS

FIG. 1 is a cross-sectional side view of the relief valve, taken along the center line of the inlet passageway;

FIG. 2 is a top view of the relief valve;

FIG. 3 is a front view of the relief valve;

FIG. 4 is a side view of the cover for the relief valve, taken from the same position as FIG. 1;

FIG. 5 is a top view of the cover of FIG. 4; and

FIG. 6 is a side end view of a shear pin used with the present invention.

DETAILED DESCRIPTION OF A PREFERRED EMBODIMENT

Referring initially to FIG. 1, a preferred embodiment of the invention is shown. The relief valve in this instance comprises a body 10, a sub 12, a stem 14, a seal 16, a cushion 18, a link 20, a shear bar 22, a shear pin 24, a setting plate 26 (FIG. 2) and a cover 28. The sub 12 has a cylindrical through-hole along its axis. The bottom end of the hole comprises the valve inlet 30. The exterior of the bottom end of the sub has male threads as is common for "screwed connection" pressure relief valves. The top end of the sub 12 is also threaded, and is screwed into a threaded opening in the bottom of the body 10.

The body 10 also defines a horizontal cylindrical outlet 32. The axis of the outlet 32 is perpendicular to the axis of the inlet 30. The interior of the outlet 32 closest to the exterior of the body 10 is threaded with female threads so as to receive a threaded male pipe connection. The diameter of the cylindrical output 32 is greater than the diameter of the cylindrical inlet 30.

The body 10 further defines a pocket 34 in axial alignment with the inlet 30 and placed above the outlet 32. The pocket 34 is cylindrical and has a larger diameter than head 54. A stem bore 36 is in axial alignment with the inlet 30 and the pocket or counterbore 34 and extends through the top of the pocket 34 to the exterior of the body 10. The stem bore 36 is cylindrical and is of a smaller diameter than the inlet 30.

The body 10 has a first slotted projection or shackle 38 on the top of the body. The slotted projection 38 has aligned circular holes 40 which are formed on an axis which is perpendicular to the slot and which extends through both sides or arms of the slot. The slotted projection 38 is situated so that the axis of the slot perpendicular to the axes of the circular bores 40 intersects the axis of the stem bore 36.

The body 10 also has a second slotted projection or shackle 42 similar to the first slotted projection 38. The second slotted projection 42 defines a circular bore 44 which extends through both sides or arms of the slotted projection 42. The slotted projection 42 is situated so that the stem bore 36 is between the first slotted projection 38 and the second slotted projection 42.

The top of the body 10 has a third projection 46 which is on the opposite side of the projection 38 from the projection 42. A circular bore 48 in the projection 46 is parallel to the bores 40 and 44. The relative alignments of the three bores is best shown in FIG. 2.

The stem 14 comprises an elongated cylindrical member which extends slidingly through a bushing 15 in the bore 36. The top end of the stem 14 is preferably rounded and protrudes out of the body 10. The bottom end of the stem 14 reaches into the inlet 30 and terminates in a valve or seal assembly which is designed to seal the inlet 30. As illustrated, a preferred form of valve or seal assembly comprises a cylindrical stem flange or head 54 which is smaller in diameter than the seal 16. Said head 54 is spaced from the lower end of the stem 14. A cylindrical seal 16 formed of a suitable elastomer fits around the stem 14 below the head 54 and above a cylindrical washer 55. A cotter pin or equivalent locking means is used to lock the washter 55 and the seal 16 in position on the stem 14 below the head 54. The seal 16 may have a metallic or other solid disc bonded to its upper surface to be in contact with the bottom surface of the head 54. The entire valve assembly is sized to engage a counterbore at the upper end of the inlet in a slidable, fluid-tight seal. Upward movement of the assembly in the counterbore ultimately establishes a fluid passageway from the inlet 30 through the body 10 to the outlet 32.

The cushion 18 comprises a short solid cylinder of elastomeric material. The cushion 18 is used to fit snugly within the pocket or counterbore 34. The cushion 18 defines a cylindrical hole through its center sized to receive the stem 14 in a sliding fit. When pressure against the bottom side of the seal 16 forces the stem 14 upwards, the cushion 18 receives the impact of the top of the stem head 54.

The link 20 is shaped somewhat like a tuning fork with a bar-like structure at its pivot end 62 and a clevis or shackle-like structure 70 at its other end. The pivot end 62 of the link 20 is pivotally mounted on the body 10 by a pin 66 which fits with the circular bore of the projection 42 and a cylindrical bore 64 in the link 20. Cotter pins 68 or equivalent means may be used to secure the pin 66.

A pivot end 76 of the shear bar 22 defines a circular bore 78 through the vertical sides of the pivot end. The bore 78 is of the same diameter as the circular bore 40 of the slotted projection 38. When the bore 78 is aligned with the circular bore 40, a short cylindrical shear bar pin 80 is inserted through both bores, thus hinging the shear bar 22 to the body 10. A cotter pin 82 may be used to secure the pin 80 in place.

When the shear bar 22 is in its normal operating position, the longitudinal axis of the shear bar 22 will be approximately perpendicular to the longitudinal axis of the stem 14. In this position, the bottom side of the shear bar 22 rests upon the top end of the arm 14, as the stem 14 protrudes out from the top of the body.

The clevis end 70 of the link 20 is sized to readily receive the shear bar 22 between the arms of the clevis. The link 20 is connected to the shear bar 22 by means of a shear pin 24 which fits within matching holes 74 in the arms of the clevis and one of a series of holes 84 in shear bar 22. The holes 84 in the shear bar 22 are normally circular, but the matching hole 74 in the link 20 is preferably non-circular as to require a unique shear pin 24. A particularly suitable design for the hole 74 is half-round as shown in FIG. 6 with a diameter which matches the diameter of the circular holes 84 in the bar 22. The cross-section and material of the pin 24 are selected to provide a pin which will shear when the pressure exerted on the lower side of the valve assembly in the inlet 30 reaches a particular value.

As will be apparent in the drawings, the half-round hole 74 and the matching hole 84 in the bar 22 will normally have axes which are parallel to the axis of the pin 66. As will also be apparent, the machining hole 84 in the bar 22 may be one of several holes which are spaced from one another along the bar 22. The several holes are also preferably spaced along an arc of a circle which is centered about the longitudinal axis of the pin 66. Thus, any one of the several holes may be aligned with the half-round hole 74 to receive a common shear pin 24. In each instance the shear bar 22 will remain in the same orientation relative to the stem 14—i.e., the longitudinal axis of the shear bar will be normal to the longitudinal axis of the stem 14. By selectively spacing the holes in the shear bar, several different pressure limits of known value can be set for the overall relief valve structure, since use of a common-type, special shear pin 24 is contemplated.

Referring to FIG. 2, the setting plate 26 is a flat horizontal piece of metal attached to the top of the body 10. A separate number, each representing a particular relief pressure, is written on the setting plate 26 alongside each one of the holes 84. The lowest relief pressure setting is represented by the aligned holes closest to the axis of stem bore 36. The highest relief pressure setting is represented by the aligned holes farthest from the axis of stem bore 36.

Referring to FIGS. 3, 4, and 5, the cover 28 is a hollow dome shaped member, open at the bottom and pivotally attached to the body 10 by means of a clevis pin 88 extending through the circular bore 48 of the projection 46. The cover 28 is shaped to surround and enclose the shear bar 22, the link 20, and the shear pin 24 and to rest flush against the top of the body 10. The cover 28 is held in position, when the valve is set, by means of a latch spring 86 attached to the inside of the cover 28 and hooked under the end of the shear bar 22. When the valve relieves, the shear bar is free to move and the cover 28 is rotated about its clevis pin 88 by the turning action produced by a cover spring 90. The speed of rotation is controlled by the strength of the cover spring 90 and the weight of the cover 28 such that the pieces of the broken shear pin 24 and the rotating shear bar 22 are prevented from becoming a hazard to persons in the vicinity of the valve. When the cover 28 is open, it becomes a visual indication that the valve has relieved. The cover 28 can be manually opened by releasing the latch spring 86 from the shear bar 22 by pulling on a portion of the latch spring 86 which projects through a slot in the cover 28. The cover spring 90 will normally be a spring wound around the clevis pin 88.

OPERATION

In operation, the relief valve is assembled as shown in the drawings, and the inlet sub 12 is connected to a pressurized line or vessel. The outlet 32 may be connected to a discharge line, or simply open to the atmosphere. The shear bar 22 is positioned horizontally with its lower surface engaging the top end of the stem 14, and the bar is connected to the pivoted link 20 by inserting a shear pin 24 through the non-circular holes in the upper end of link arms and through a selected one of the holes 84 in the bar. As previously mentioned, the selection of a particular bar hole 84 determines the relief pressure setting. The valve seal 16 closes off the inlet 30 to outward flow. The cover 28 then is pivoted about the pin 88 to closed position where the spring 86 snaps into position under the outer end of the bar 22.

When the valve seal and head 16, 54 are subjected to a pressure from below in excess of the set relief pressure, the pin 24 shears to enable the bar 22 to pivot upwardly about the pivot pin 80. This enables the valve stem 14 to shift upwardly to communicate the inlet 30 with the outlet 32 and thereby relieve the inlet pressure. As the bar 22 pivots, its outer end is released from engagement with the latch spring 86, so that the cover spring 90 can cause the cover to swing open and provide a readily visible indication that the valve has relieved. The elastomer element 18 cushions the impact of the valve head 54 as it shifts upwardly.

The relief valve can be readily reset by pivoting the link 22 downward to reposition the stem 14, and then inserting a new shear pin through the aligned holes 74, 84. The cap 28 is closed and retained by the latch spring 86 which engages underneath the outer end of the bar 22.

It now will be recognized that a new and improved pressure relief valve has been disclosed. The shear pin has a non-standard cross-section to prevent replacement by some other conventional item, and a number of different pressure relief settings can be obtained through selection of the proper shear bar hole. The valve cover is arranged not only to protect the valve from accidental damage, but to provide a clearly visible indication that the valve has actuated. Moreover, the valve assembly is of a relatively simple, but rugged construction.

Although a preferred embodiment of the present invention has been illustrated and discussed herein, numerous modifications and alternative embodiments of the apparatus of this invention will be apparent to those skilled in the art in view of this description. Accordingly, this description is to be construed as illustrative only and is provided for the purpose of teaching those skilled in the art the manner of constructing the apparatus of the invention. It is to be understood that the forms of the invention shown and described are to be considered as the presently preferred embodiments. Various changes may be made in the configurations, sizes, and arrangements of the parts of the invention, as will be recognized by those skilled in the art, without departing from the scope of the invention. For example, equivalent elements might be substituted for those illustrated and described, parts or connections may be reversed or otherwise interchanged, and certain features of the invention may be utilized independently of the use of other features, all as will be apparent to one skilled in the art after receiving the benefit attained through reading the foregoing Description of the Invention.

What is claimed is:

1. A pressure relief valve comprising:
   (a) a hollow body having an inlet passageway at its bottom, a side outlet passageway, and a top passageway axially aligned with said inlet passageway;
   (b) a valve fitted within said inlet passageway in sliding fluid tight relation;
   (c) a valve stem connected at its lower end to said valve and extending through said top passageway in sliding relation to terminate exterior of said body;
   (d) a transversely disposed bar member arranged to rest on top of said valve stem at an intermediate point along said bar member when said valve is seated in said inlet passageway;
   (e) one end of said bar member pivotally mounted on said hollow body to enable said bar member to pivot in a plane along the axis of said stem, the opposite end of said bar defining a plurality of holes spaced along said bar member in an arc of a circle;
   (f) a link interconnecting said opposite end of said bar member to said body when said valve is seated in said inlet passageway, said link defining a hole in a first end thereof positioned to register with one of said holes in said bar member so as to receive a shear pin to connect said bar member with said link, the end of the link opposite said first end of said link pivotally mounted in said body along a link pivot axis parallel to the pivot axis of said bar member, said link pivot axis being the center of said arc;
   (g) a hollow cover member configured to enclose the top of said body member, including said bar member, and pivotally mounted to the top of said body member on a side of said body member substantially laterally opposite from said opposite end of said bar in relation to said valve stem;
   (h) a spring member interposed between said cover member and said body member and biased to urge said cover member to move about its pivot mounting so as to uncover the top of said body member; and
   (i) a latch interconnecting said cover member and said opposite end of said bar member pending the shearing of said shear pin connecting said bar member and said link.

2. A pressure relief valve comprising:
   (a) a hollow body member having a bottom pressure inlet, a side pressure outlet, and a top passageway axially aligned with said inlet;

(b) a valve in said body member adapted to seat in said inlet and to open into said body member;

(c) a valve stem connected at its bottom end to said valve and extending in sliding relation through said passageway to terminate atop said body member;

(d) a bar adapted to rest transverse to and on the upper end of said stem at a point intermediate the ends of the bar;

(e) a first end of said bar pivotally mounted on the top of said body member to enable said bar to swing around such pivot in a plane including the axis of said passageway;

(f) a link pivotally mounted at a first end to the top of said body member to swing around such pivot in substantially the same plane as said bar, the other end of said link adapted to be frangibly connected to said bar when said bar rests on said upper end of said stem;

(g) a hollow dome-shaped cover, open and shaped at the bottom to fit on the top of said body member, and pivotally mounted on said body member to open and uncover said top, said bar, and said link, and wherein the pivot axis of said cover is substantially parallel to the pivot axis of said bar, and said cover is spring-biased to open; and (h) a latch attached to said cover and configured to engage said bar at a point spaced from said first end of said bar to restrain said cover from opening pending breaking of said frangible connection.

3. A pressure relief valve comprising:

(a) a hollow body having an inlet passageway at its bottom, a side outlet passageway, and a top passageway axially aligned with said inlet passageway;

(b) a valve fitted within said inlet passageway in sliding fluid tight relation;

(c) a valve stem connected at its lower end to said valve and extending through said top passageway in sliding relation to terminate exterior of said body;

(d) a transversely disposed bar member arranged to rest on top of said valve stem at an intermediate point along said bar member when said valve is seated in said inlet passageway;

(e) one end of said bar member pivotally mounted on said hollow body to enable said bar member to pivot in a plane along the axis of said stem, the opposite end of said bar defining a plurality of holes spaced along said bar member in an arc of a circle; and (f) a link interconnecting said opposite end of said bar member to said body when said valve is seated in said inlet passageway, said link defining a single half-round hole in a first end thereof positioned to register with one of said holes in said bar member so as to receive a shear pin to connect said bar member with said link, wherein each of the diameters of said plurality of holes in said bar member is equal to the diameter of said half-round hole, the end of the link opposite said first end of said link pivotally mounted in said body along a link pivot axis parallel to the pivot axis of said bar member, said link pivot axis being the center of said arc.

4. A pressure relief valve comprising:

(a) a hollow body member having a bottom pressure inlet, a side pressure outlet, and a top passageway axially aligned with said inlet;

(b) a valve in said body member adapted to seat in said inlet and to open into said body member;

(c) a valve stem connected at its bottom end to said valve and extending in sliding relation through said passageway to terminate atop said body member;

(d) a bar adapted to rest transverse to and on the upper end of said stem at a point intermediate the ends of the bar;

(e) a first end of said bar pivotally mounted on the top of said body member to enable said bar to swing around such pivot in a plane including the axis of said passageway;

(f) a link pivotally mounted at a first end to the top of said body member to swing around such pivot in substantially the same plane as said bar, the other end of said link adapted to be connected by a frangible shear pin to said bar when said bar rests on said upper end of said stem, and wherein said other end of said link defines a single hole substantially normal to the pivot plane of said link; and (g) said bar defines a plurality of holes substantially normal to said pivot plane, and wherein said hole in said link and said holes in said bar are sized to receive said shear pin, and when said bar rests on said upper end of said stem, said holes are spaced along an arc of a circle whose center is the pivot of said link and said holes register with said single hole in said link, wherein said single hole in said other end of said link is half-round with a diameter equal to the diameters of said plurality of holes in said bar.

* * * * *